US005343800A

United States Patent [19]

Wu

[11] Patent Number: 5,343,800

[45] Date of Patent: Sep. 6, 1994

[54] SEASONING CAN STRUCTURE

[76] Inventor: Otto Wu, Room 918, 15 Fu Hsing N. Road, Taipei, Taiwan

[21] Appl. No.: 156,728

[22] Filed: Nov. 24, 1993

[51] Int. Cl.[5] .......................... A21C 9/04; B01F 15/02

[52] U.S. Cl. .......................... 99/494; 222/234; 366/260

[58] Field of Search .................. 99/494, 485; 222/226, 222/233, 234; 366/255, 256, 260, 184, 332, 333, 219, 240

[56] References Cited

U.S. PATENT DOCUMENTS

| | | | |
|---|---|---|---|
| 2,481,352 | 9/1949 | Sabatella | 366/260 |
| 3,179,302 | 4/1965 | Murray | 222/233 |
| 3,203,703 | 8/1965 | Lely | 222/234 |
| 3,589,685 | 6/1971 | Gradishar | 366/260 |
| 4,195,753 | 4/1980 | Dyer | 222/233 |
| 5,109,760 | 5/1992 | Ansari | 99/494 |

*Primary Examiner*—Robert W. Jenkins
*Attorney, Agent, or Firm*—Bacon & Thomas

[57] ABSTRACT

A seasoning can structure includes an open can body to receive therein the seasoning, a cover being releasably secured to the opening of the can body. A seasoning dispensing device is mounted on the cover to dispense the seasoning contained in the can. A seasoning block breaking device is provided, including an elongated rod extending from the bottom of the can into the can body with a number of sideward arms fixed thereon so that by reciprocally moving the rod relative to the can body, the arms hit and thus break the seasoning blocks formed by the seasoning particles bonding together. Biasing device is disposed on the bottom of the can body to help reciprocally moving the breaking device relative to the can body.

7 Claims, 5 Drawing Sheets

SEASONING CAN STRUCTURE

FIELD OF THE INVENTION

The invention is directed generally to a seasoning can and in particular to a seasoning can having a breaking device for breaking the seasoning blocks formed by the seasoning particles bonding together.

BACKGROUND OF THE INVENTION

Seasonings are a must in cooking and seasoning cans are very commonplace in both kitchen and dinning table. One type of the conventional seasoning cans comprises an open can body inside which the seasoning is disposed. A tea spoon or small spoon of other types are used to take a required amount of the seasoning from the can. This is inconvenient in doing cooking, for one must use one hand to hold the can and use the other hand to hold the spoon.

Another type of the conventional seasoning cans comprises a can body with a holed cover for shaking out the seasoning contained therein, such as a salt shaker. This type of seasoning can has a disadvantage that once the seasoning particles bond together to form large blocks due to exposure to a humid environment for some time, it is difficult to shake the seasoning out of the seasoning can.

It is therefore desirable to provide an improved seasoning can structure which overcomes the above-mentioned problems.

SUMMARY OF THE INVENTION

The principal objective of the present invention is to provide a seasoning can structure which allows a user to use the seasoning can with a single hand and has a breaking derive for breaking the seasoning blocks formed by the seasoning particles bonding together.

According to the present invention, there is provided a seasoning can structure comprising an open can body to receive therein the seasoning, a cover being releasably secured to the opening of the can body. A seasoning dispensing device is mounted on the cover to dispense the seasoning contained in the can. A seasoning block breaking device is provided, comprising an elongated rod extending from the bottom of the can into the can body with a number of sideward arms fixed thereon so that by reciprocally moving the rod relative to the can body, the arms hit and thus break the seasoning blocks formed by the seasoning particles bonding together. Biasing device is disposed on the bottom of the can body to help reciprocally moving the breaking device relative to the can body.

BRIEF DESCRIPTION OF THE DRAWINGS

Other objectives and advantages of the invention will be apparent from the following description of a preferred embodiment of the present invention taken in connection with the accompanying drawings wherein.

DETAILED DESCRIPTION OF THE PREFERRED EMBODIMENT

Figure 1:
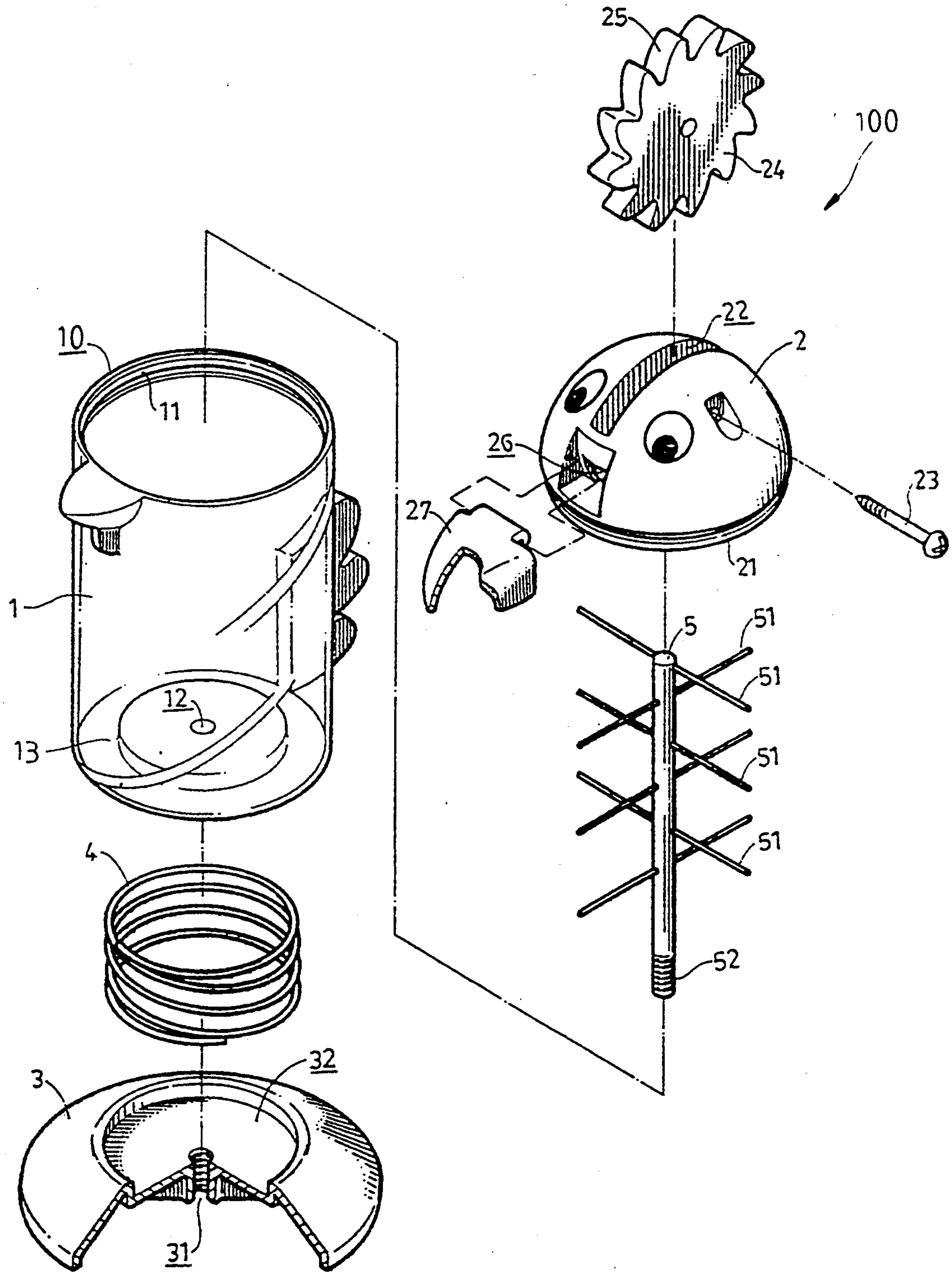
FIG. 1 is an exploded perspective view showing a preferred embodiment of a seasoning can constructed in accordance with the present invention.
Figure 2:
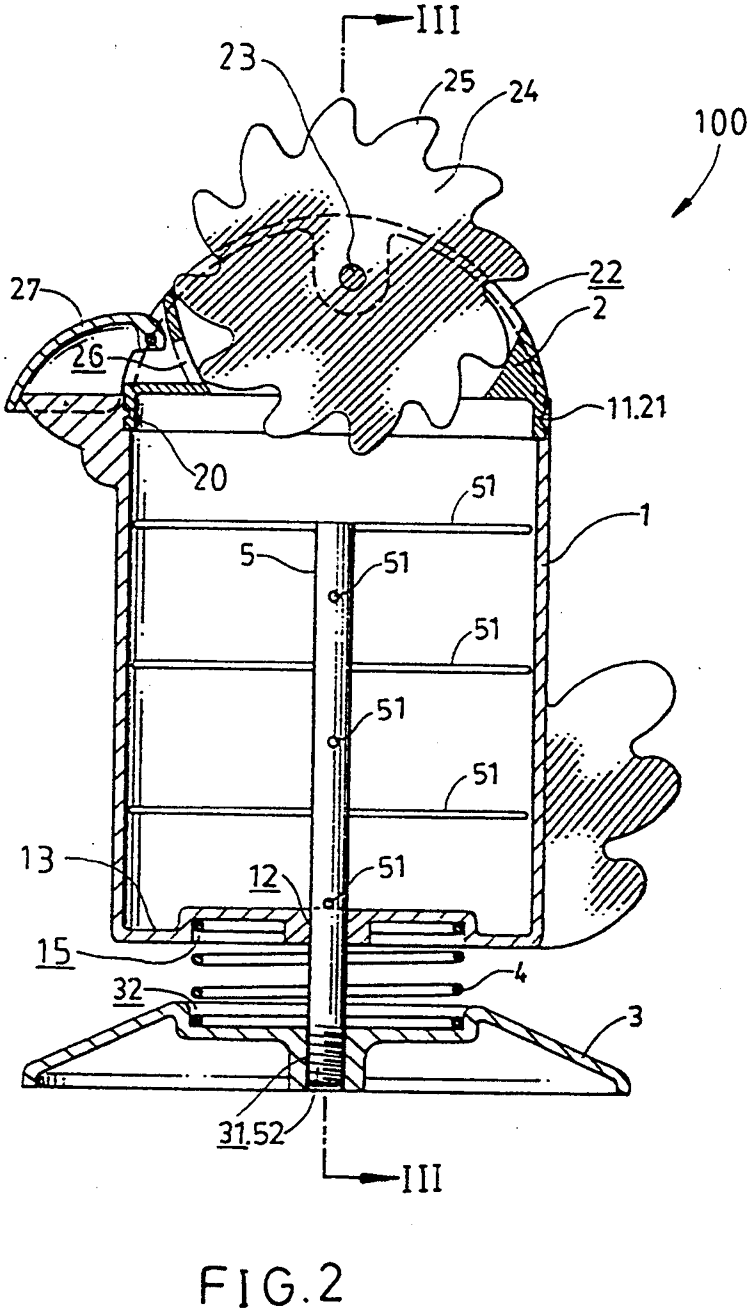
FIG. 2 is a cross-sectional view showing the seasoning can of the present invention.
Figure 3:
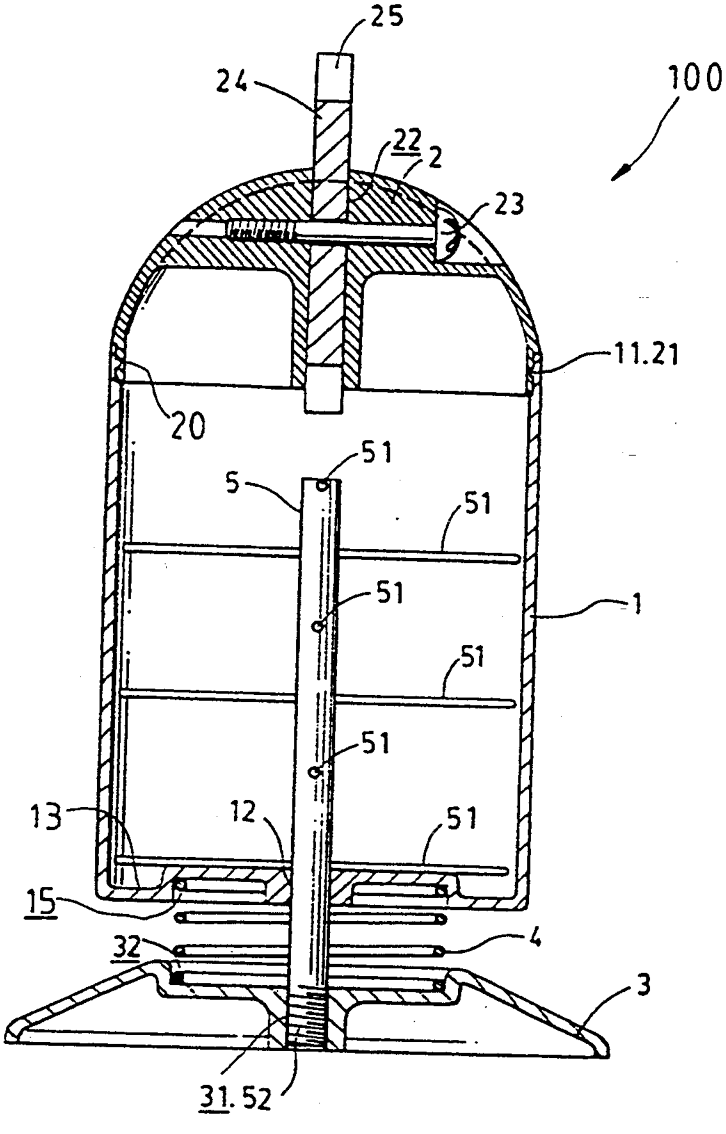
FIG. 3 is a sectional view taken along line III-III of FIG. 2.

With reference to the drawings and in particular to FIGS. 1, 2 and 3, wherein a seasoning can constructed in accordance with the present invention, generally designated with the reference numeral 100, is shown, the seasoning can 100 comprises a can body 1, which is preferably a hollow cylinder with an open upper end defining an opening 10 and a closed lower end defining a bottom 13 for receiving and containing therein a particle form seasoning 70 (FIG. 4), such as salt, pepper or sugar particles. A cover 2, preferably a hemispherical member having a circular flange 20 formed on the bottom periphery thereof, is releasably secured to the upper opening 10 of the can body 1, with the circular flange 20 fit into the upper opening 10 of the can body 1, preferably by the inner thread 11 formed on the upper opening 10 of the can body 1 engaging the mating outer thread 21 formed on the circular flange 20 of the cover 2.

Figure 4:
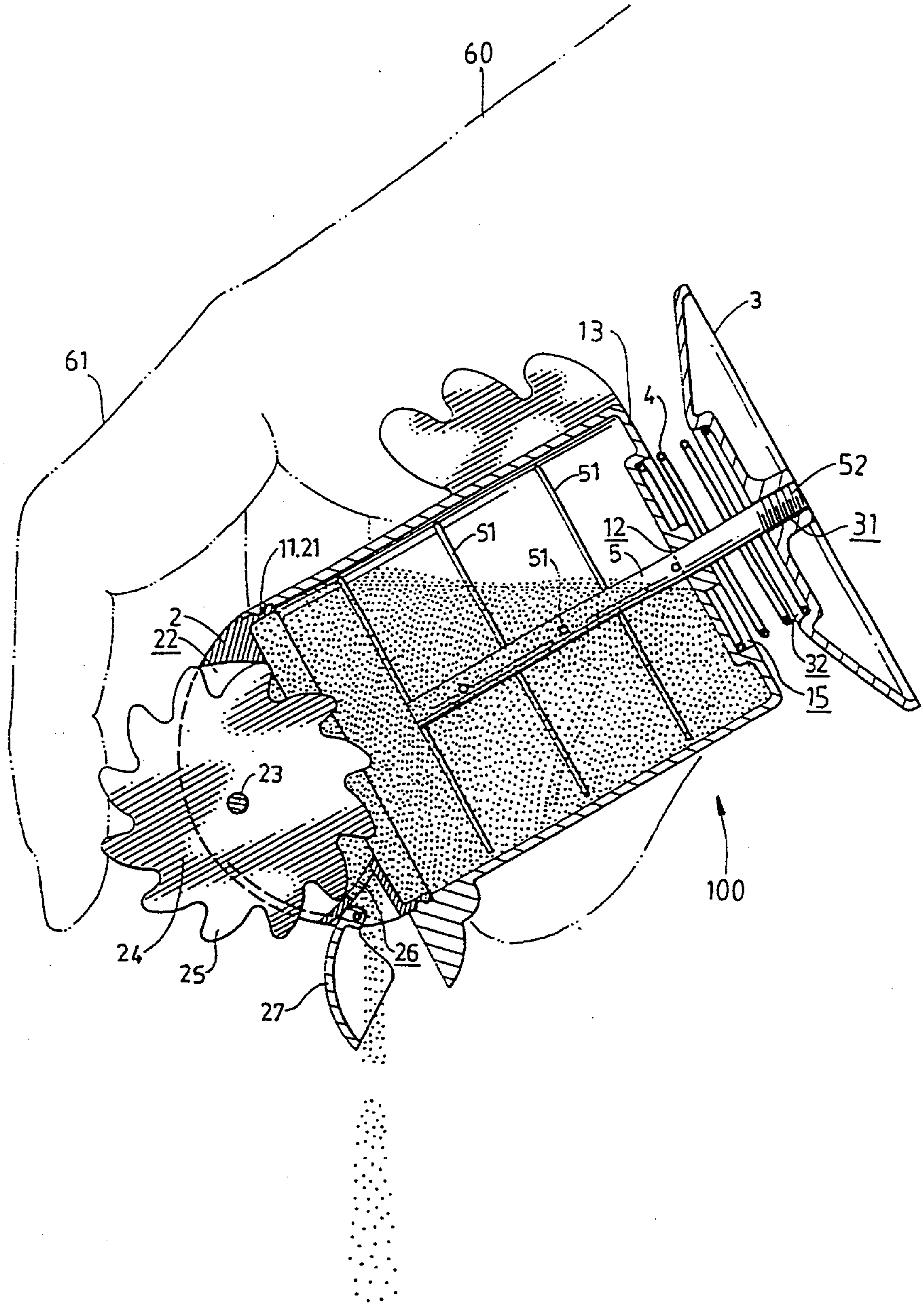
FIG. 4 is a cross-sectional view showing the dispensing of the seasoning contained in the seasoning can of the present invention.

The seasoning can 100 is provided with seasoning dispensing means comprising a dispensing wheel 24 having a number of teeth 25 formed on a circumference thereof. A through slot 22 preferably extending in a diametric direction of the can 100 is formed on the cover 2 to rotatably receive the dispensing wheel 24 therein. The dispensing wheel 24 is preferably rotatably supported in the slot 22 by a pin, such as a screw 23, extending through the slot 22. The dispensing wheel 24 is so mounted that when a user uses a hand 60 to hold the can body 1, the index finger 61 is able to touch and rotate the dispensing wheel 24 to have the teeth 25 of the wheel 24 contact and drive the seasoning particles 70 out of the can body 1, as shown in FIG. 4.

An outlet opening 26 is formed on the cover 2 in communication with the slot 22 so that when the dispensing wheel 24 is rotated to have the teeth 25 thereof contact and drive the seasoning particles 70 into the outlet opening 26, the season particles 70 are dispensed through the outlet opening 26 and the dispensed quantity of the seasoning 70 is controllable by the rotation angle of the dispensing wheel 24.

A lid 27 may be pivoted to the cover 2 at the outlet opening 26 for preventing dirt from entering the seasoning can 100 via the outlet opening 26. Preferably, the lid 27 is loosely pivoted to the outlet opening 26 so that by inclining the seasoning can 100, as shown in FIG. 4, the lid 27 automatically rotate away from the outlet opening 26 to provide a cleared outlet opening.

A base 3 is disposed under the bottom 13 of the can body 1 with biasing means, such as a helical spring 4, disposed therebetween so as to allow the can body 1 to be biasingly supported on the base 3. Preferably, the spring 4 is made of a non-corrosion material, such as stainless steel or plastics.

The seasoning can 100 of the present invention is provided with seasoning block breaking means which comprises an elongated rod 5 fixed on the base 3 and extending into the can body 1 through a hole 12 formed on the bottom 13 of the can body 1. Preferably, the rod 5 has a threaded end 52 to engage an inner-threaded hole 31 formed on the base 3 to fix the rod 5 on the base 3. A plurality of breaking arms 51 are fixed on the rod 5 along a longitudinal direction and around a circumferential direction thereof. The breaking arms 51 are located within the can body 1 so that by moving the can body 1 relative to the base 3 and against the spring 4, the breaking arms 51 are forced to penetrate through the seasoning particles 70 contained within the can body 1 and thus breaking the seasoning blocks, if any.

Figure 5:
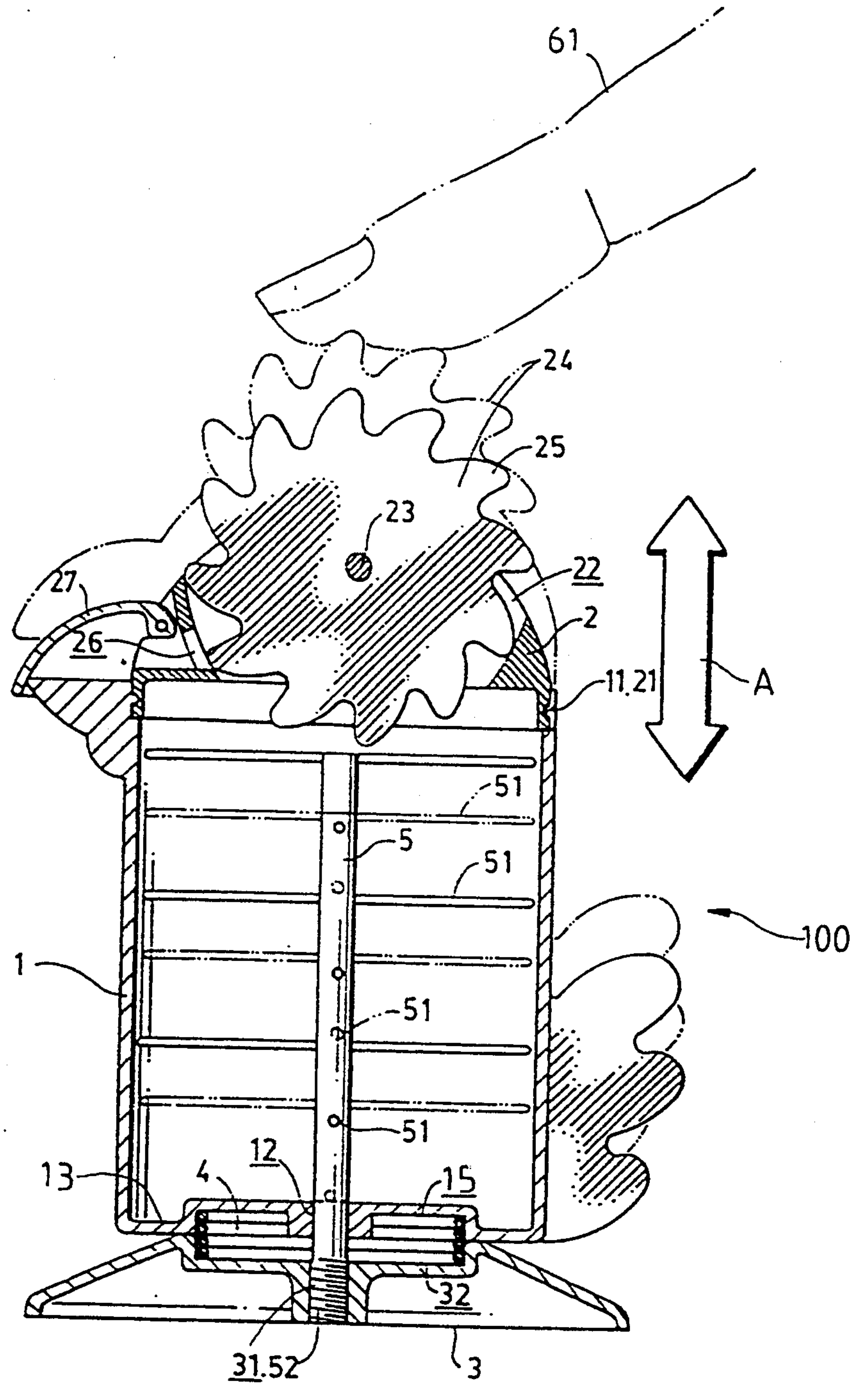
FIG. 5 is a cross-sectional view showing the operation of the breaking device of the seasoning can of the present invention.

As illustrated in FIG. 5, the spring 4 helps returning the can body 1 back to its original position once the can body 1 is moved relative to the base 3 and released. This provides a reciprocal movement of the can body 1 relative to the base 3, indicated by the double-headed arrow A of FIG. 5, for completely breaking the seasoning blocks which are formed inside the can body 1.

Preferably, the bottom 13 of the can body has a recessed portion 15 and the base 3 has a recessed portion 32 to respectively hold the ends of the spring 4 so as to secure the spring 4 between the base 3 and the can body 1.

It is apparent that although the invention has been described in connection with the preferred embodiment, those skilled in the art may make changes to certain features of the preferred embodiment without departing from the spirit and scope of the invention as defined in the appended claims.

What is claimed is:

1. A seasoning can structure comprising:

a can body having a closed lower end defining a bottom and an open upper end defining an upper opening so as to form a container for receiving therein seasoning particles;

a cover having a lower flange releasably engageable with the upper opening of said can body, said cover having an outlet opening formed thereon to allow the seasoning particles to pass therethrough for dispensing; and breaking means comprising a base disposed under the bottom of said can body with biasing means disposed therebetween to biasingly support said can body on said base and allow said can body to be movable relative to said base, an elongated rod mounted on said base and extending therefrom to insert into said can body from a hole formed on the bottom thereof, a plurality of breaking arms fixed on said rod along the longitudinal direction and around a circumferential direction thereof and extending sideward to be movable within and relative to the container defined by said can body so that by moving said can body relative to said base and against said biasing means and then releasing said can body to allow said biasing means to return said can body, said breaking arms are allowed to reciprocally moved relative to said can body and seasoning blocks formed by the seasoning particles bonding together within said can body to break the seasoning blocks into small particles.

2. A seasoning can structure as claimed in claim 1 wherein said biasing means comprises a helical spring having two ends respectively secured to said base and the bottom of said can body.

3. A seasoning can structure as claimed in claim 2 wherein a first recess is formed said base and a second recess is formed on the bottom of said can body to respectively receive and secure the ends of said spring therein so as to secure said spring between said base and said can body.

4. A seasoning can structure as claimed in claim 1 wherein said elongated rod has a threaded lower end to be engaged by an inner threaded hole formed on said base to secure said elongated rod to said base.

5. A seasoning can structure as claimed in claim 1 further comprising seasoning dispensing means for controlling the dispensing of the seasoning particles, said dispensing means comprising a finger-accessible toothed wheel rotatably supported within a through slot formed on said cover, said through slot being in communication with the outlet opening so that by rotating said toothed wheel to have the teeth thereof contact and drive the seasoning particles toward the outlet opening, said seasoning particles are allowed to be dispensed through the outlet opening.

6. A seasoning can structure as claimed in claim 1 wherein said outlet opening comprises a lid loosely pivotally mounted thereon to shield said outlet opening.

7. A seasoning can structure as claimed in claim 1 wherein said cover has an outer thread formed on the lower flange thereof and said can body has an inner thread formed on the upper opening thereof to be engageable by said outer thread of said cover so as to releasably secure said cover to said can body.

* * * * *